(12) United States Patent
Carapelli

(10) Patent No.: US 8,096,446 B2
(45) Date of Patent: Jan. 17, 2012

(54) TURBINE FLOW METER FOR USE IN FUEL DISPENSING ENVIRNOMENTS

(75) Inventor: Giovanni Carapelli, Florence (IT)

(73) Assignee: Gilbarco, S.r.l., Florence (IT)

( * ) Notice: Subject to any disclaimer, the term of this patent is extended or adjusted under 35 U.S.C. 154(b) by 707 days.

(21) Appl. No.: 12/313,148

(22) Filed: Nov. 17, 2008

(65) Prior Publication Data

US 2010/0122990 A1 May 20, 2010

(51) Int. Cl.
*B67D 7/16* (2010.01)
(52) U.S. Cl. ......................... 222/91; 73/861.84
(58) Field of Classification Search ............... 222/71, 222/40, 24; 73/861.84, 861.78, 861.79; 415/186, 415/191–195
See application file for complete search history.

(56) References Cited

U.S. PATENT DOCUMENTS

| | | | |
|---|---|---|---|
| 1,056,438 A * | 3/1913 | Munrose | 415/186 |
| 1,091,481 A * | 3/1914 | Burton | 241/46.017 |
| 3,710,622 A * | 1/1973 | Hammond et al. | 73/861.84 |
| 3,958,447 A * | 5/1976 | Baker et al. | 73/32 R |
| 4,534,226 A * | 8/1985 | Rose | 73/861.84 |
| 4,876,653 A | 10/1989 | McSpadden et al. | |
| 5,464,466 A | 11/1995 | Nanaji et al. | |
| 5,473,932 A * | 12/1995 | Fitzpatrick et al. | 73/1.28 |
| 5,509,305 A | 4/1996 | Husain et al. | |
| 5,689,071 A | 11/1997 | Ruffner et al. | |
| 5,866,824 A | 2/1999 | Schieber | |
| 5,985,002 A | 11/1999 | Grantham | |
| 6,647,806 B1 | 11/2003 | Estrada et al. | |
| 6,692,535 B2 | 2/2004 | Olivier | |
| 6,830,080 B2 | 12/2004 | Nanaji | |
| 6,854,342 B2 | 2/2005 | Payne et al. | |

FOREIGN PATENT DOCUMENTS

| | | |
|---|---|---|
| GB | 2359141 A | 8/2001 |
| JP | 07-103794 | 4/1995 |
| WO | 95/05581 A1 | 2/1995 |
| WO | 98/33043 A1 | 7/1998 |

* cited by examiner

*Primary Examiner* — Lien Ngo
(74) *Attorney, Agent, or Firm* — Nelson Mullins Riley & Scarborough LLP

(57) ABSTRACT

A turbine meter for measuring the flow of a fluid comprises a housing having an inlet port and an outlet port and defining a fluid flow path along a central axis thereof. A flow conditioner is mounted in the flow path downstream of the inlet port and has a plurality of flow deflectors canted in a first direction relative to the central axis. A first turbine rotor is located downstream of the flow conditioner and is mounted for rotation about the central axis. The first turbine rotor has a plurality of first rotor vanes canted in a second direction relative to the central axis, the second direction being opposite to the first direction. The meter further comprises a second turbine rotor located downstream of the first turbine rotor and mounted for rotation about the central axis. The second turbine rotor has a plurality of second rotor vanes canted in the first direction relative to the central axis such that the first and second turbine rotors rotate in opposite rotational directions when fluid flows through the housing at rotational speeds indicative of fluid flow rate.

18 Claims, 3 Drawing Sheets

TURBINE FLOW METER FOR USE IN FUEL DISPENSING ENVIRNOMENTS

BACKGROUND OF THE INVENTION

The present invention relates generally to turbine flow meters, such as those shown and described in U.S. Pat. Nos. 6,854,342, 6,692,535 and 5,689,071 (each of which is incorporated herein by reference in its entirety), for use in fuel dispensing environments. More particularly, the invention relates to a turbine flow meter adapted to have enhanced accuracy during low flow rate conditions.

Turbine flow meters may be used in a variety of applications in fuel dispensing environments. For example, turbine flow meters may be used to meter fuel being dispensed, measure the vapor being returned to the underground storage tank in a stage two vapor recovery system, or measure the vapor or air released to atmosphere from the ullage area of an underground storage tank when a pressure relief valve in a vent stack is opened to relieve pressure.

Turbine flow meters generally comprise a-housing having inlet and outlet ports at respective ends thereof. A shaft is located inside the housing along the housing's longitudinal axis. A turbine rotor mounted on the shaft rotates when fluid (liquid or gas) flows through the housing via the inlet and outlet ports. The rotor is made of a magnetic material such that its rotation is detected by a pickup coil mounted to the housing. As a result, the flow rate of the fluid flowing through the housing can be determined.

In some cases, the meter may have two turbine rotors, one located upstream of the other. If a respective pickup coil is provided for each rotor, the rotor frequency of each rotor can be determined. A controller divides the second rotor frequency by the first rotor frequency to derive a frequency ratio. This ratio can be used to determine the flow rate of the fluid flowing through the meter.

In a two-rotor meter, the downstream rotor will usually rotate even under low flow rate conditions. However, the velocity of the fluid may not be sufficient at low flow rates to rotate the upstream rotor. As a result, it may not be possible at low flow rates to determine the frequency ratio of the two rotors (and thus the fluid flow rate).

Those skilled in the art will appreciate the scope of the present invention and realize additional aspects thereof after reading the following detailed description of the preferred embodiments in association with the accompanying drawing figures.

SUMMARY OF THE INVENTION

In accordance with one aspect, the present invention provides a turbine meter for measuring the flow of a fluid. The meter comprises a housing having an inlet port and an outlet port and defining a fluid flow path along a central axis thereof. A flow conditioner is mounted in the flow path downstream of the inlet port and has a plurality of flow deflectors canted in a first direction relative to the central axis. A first turbine rotor is located downstream of the flow conditioner and is mounted for rotation about the central axis. The first turbine rotor has a plurality of first rotor vanes canted in a second direction relative to the central axis, the second direction being opposite to the first direction.

The meter further comprises a second turbine rotor located downstream of the first turbine rotor and mounted for rotation about the central axis. The second turbine rotor has a plurality of second rotor vanes canted in the first direction relative to the central axis such that the first and second turbine rotors rotate in opposite rotational directions at rotational speeds indicative of fluid flow rate when fluid flows through the housing.

In some exemplary embodiments, the flow deflectors of the flow conditioner are rotor vanes and the flow conditioner is rotational about the central axis. For example, the flow conditioner may be configured to rotate in an opposite direction from the first turbine rotor when fluid flows through the housing. The vanes of the flow conditioner may be canted in an opposite direction but at substantially the same angle as the first rotor vanes. Alternatively, the flow conditioner may be nonrotatable.

Preferably, the meter may further comprise at least one detector affixed to the housing and operative to detect rotation of a corresponding one of the first and second turbine rotors. The at least one detector may comprise first and second detectors respectively associated with the first and second turbine rotors. In such embodiments, the detectors may be respective pickoff coils.

According to another aspect, the present invention provides a fuel dispenser for dispensing fuel to a vehicle. The dispenser comprises a nozzle, a hose connected to the nozzle and a control system. A fuel delivery line is in fluid communication with the hose. A valve is located inline the fuel delivery line and under control of the control system such that the control system opens the valve to allow fuel to flow through the fuel delivery line to be delivered through the hose and the nozzle to the vehicle.

The dispenser of the present invention further includes a turbine meter located inline the fuel delivery line. The turbine meter includes a housing defining a flow path between an inlet port and an outlet port. A flow conditioner having vanes canted in a first direction is mounted in the flow path. A first turbine rotor is mounted downstream of the flow conditioner and has vanes canted in a second direction opposite the first direction. A second turbine rotor is mounted on the shaft downstream of the first turbine rotor and is also rotational about the axis. The second turbine rotor has vanes canted in the first direction such that the first and second turbine rotors rotate in opposite directions when fuel flows through the housing. First and second detectors are operative to detect rotation of a respective one of the first and second turbine rotors.

A still further aspect of the present invention provides a turbine meter for measuring the flow of a fluid. The meter comprises a housing defining a fluid flow path. A flow conditioner is mounted in the flow path and has a plurality of flow deflectors canted in a first direction. A first turbine rotor located downstream of the flow conditioner has a plurality of first rotor vanes canted in a second direction opposite to the first direction. A second turbine rotor located downstream of the first turbine rotor has a plurality of second rotor vanes canted in the first direction such that the first and second turbine rotors rotate in opposite rotational directions when fluid flows through the housing. First and second detectors are respectively associated with the first and second turbine rotors to detect rotation thereof.

Other objects, features and aspects of the present invention are provided by various combinations and subcombinations of the disclosed elements, as well as methods of practicing same, which are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Figure 1:
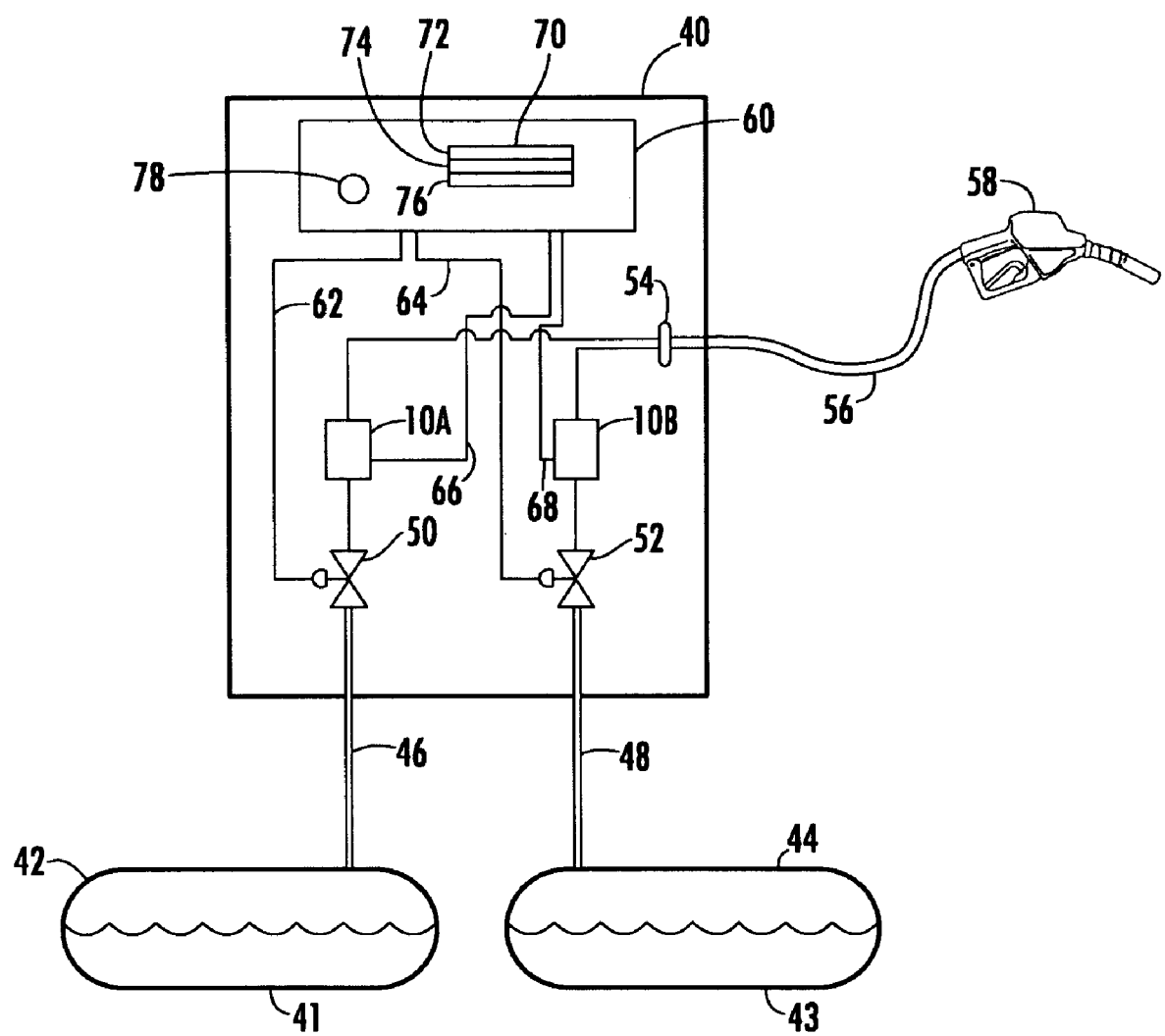
FIG. 1 is a schematic diagram of a fuel dispenser for fueling vehicles that may utilize one or more turbine flow meters constructed in accordance with the present invention.

Repeat use of reference characters in the present specification and drawings is intended to represent same or analogous features or elements of the invention.

DETAILED DESCRIPTION OF THE PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

FIG. 1 illustrates a pair of turbine flow meters 10A and 10B utilized in a fuel dispenser 40. As is well-known, a fuel dispenser such as dispenser 40 is used to measure the amount of fuel being delivered to a vehicle (not shown). Accurate meters are required to measure fuel dispensing to comply with Weights & Measures regulatory requirements.

Fuel dispenser 40 may be a blending type fuel dispenser wherein a low-octane fuel 41 stored in a low-octane underground storage tank (UST) 42 and a high-octane fuel 43 stored in a high-octane underground storage tank (UST) 44 are blended such that fuel dispenser 40 may deliver either low-octane fuel 41, high-octane fuel 43, or a mixture of both to the vehicle. In this regard, low-octane fuel 41 is supplied to fuel dispenser 40 through a low-octane fuel supply conduit 46. Likewise, high-octane fuel 43 is delivered to fuel dispenser 40 through a high-octane fuel supply conduit 48. Both low-octane fuel 41 and high-octane fuel 43 pass through fuel dispenser 40 in their own independent flow paths. Each fuel 41, 43 encounters a valve 50, 52 that controls whether the fuel is allowed to enter into fuel dispenser 40, and if so at what flow rate. U.S. Pat. No. 4,876,653 entitled "Programmable Multiple Blender," incorporated herein by reference in its entirety, describes a system for blending low and high octane fuels. As either low-octane fuel 41, high-octane fuel 43, or both pass through their respective turbine meters 10A, 10B, the fuels come together in the blend manifold 54 to be delivered through a hose 56 and nozzle 58 into the vehicle. Valves 50, 52 may be proportionally controlled by a controller 60 via control lines 62, 64.

Controller 60 determines when a fueling operation is allowed to begin. Typically, a customer is required to push a start button 78 and indicate which octane of fuel 41, 43 is desired. Controller 60 thereafter controls valves 50, 52 to allow low-octane fuel 41 or high-octane fuel 43 (or a blend of the two) to be dispensed, depending on the type of fuel selected by the customer.

After fuel 41, 43 passes through respective valves 50, 52, it flows through the associated one of turbine meters 10A, 10B. If only a low-octane fuel 41 or high-octane fuel 43 was selected by the customer to be dispensed, controller 60 would only open one of the valves 50, 52. As fuels 41, 43 flow through turbine meters 10A, 10B, pickoff coils on each of turbine meters 10A, 10B produce a pulser signal 66, 68 that is input into controller 60. Controller 60 determines the amount of fuel flowing through turbine meters 10A, 10B for the purpose of determining the amount to charge a customer for delivery of such fuel.

Controller 60 uses the data from the pulser signal 66, 68 to generate a totals display 70. Totals display 70 includes an amount to be charged to the customer display 72, the amount of gallons (or liters) dispensed display 74 and the price per unit of fuel display 76.

In other embodiments, a turbine meter of the present invention may be used in a vent stack of a underground storage tank at a service station. It may be desirable to measure the amount of air flowing through a vent stack using the meter to determine how often and how much air is separated by a membrane and released to atmosphere for any number of diagnostic or information purposes. The membrane may either permeate hydrocarbons or permeate oxygen or air as disclosed in U.S. Pat. Nos. 5,464,466 and 5,985,002, both of which are incorporated herein by reference in their entirety. In other embodiments, meter 10 may measure the amount of vapor being returned to the underground storage tank in a stage two vapor recovery system.

Figure 2:
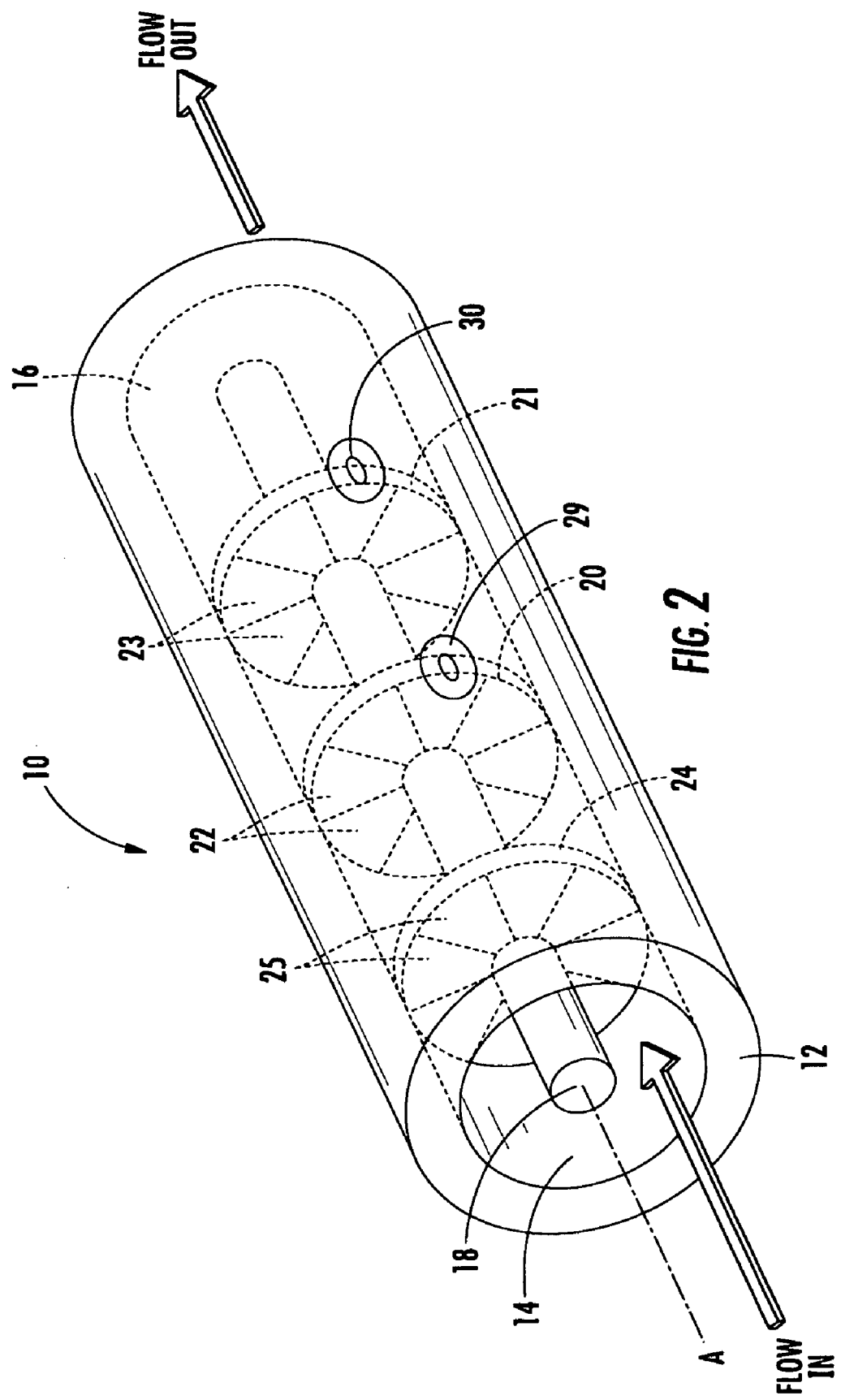
FIG. 2 is a diagrammatic perspective view of a turbine flow meter constructed in accordance with an embodiment of the present invention.

FIG. 2 illustrates a meter 10 constructed in accordance with the present invention. Meter 10 includes a housing 12 that forms an inlet port 14 and an outlet port 16 for ingress and egress of fluid (liquid or gas), respectively. A shaft 18 or other support structure is located inside of housing 12 along a central axis A. A pair of turbine rotors 20 and 21 that rotate in a plane perpendicular to axis A are located at selected axial positions on shaft 18. In this case, shaft 18 is stationary but supports rotors 20 and 21 for rotation. Generally, a bearing set will be interposed between each of the rotors and the shaft 18 to facilitate the respective rotor's rotation.

As shown, rotor 20 is located slightly upstream of rotor 21. Accordingly, rotor 20 may be referred to as the "first turbine rotor," with rotor 21 being referred to as the "second turbine rotor." A flow conditioner 24 is also positioned in housing 12, preferably located slightly upstream of first turbine rotor 20.

Figure 3:
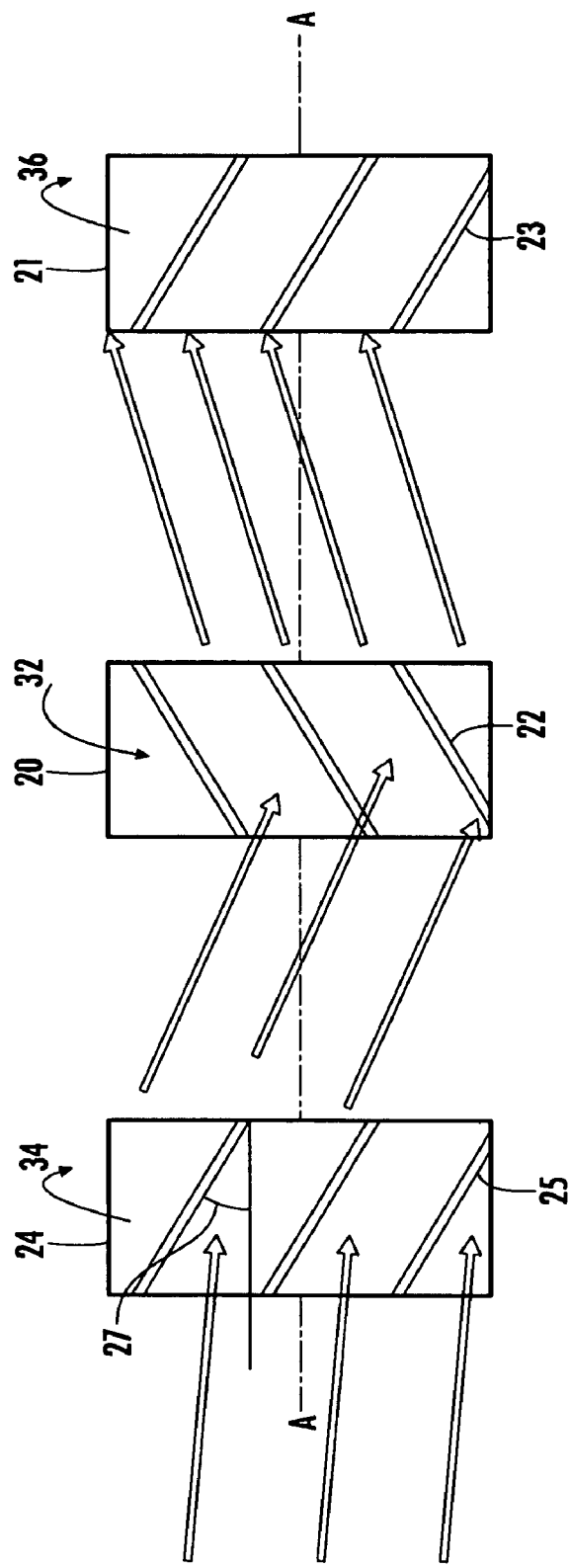
FIG. 3 is an illustration of a flow pattern of a turbine flow meter constructed in accordance with the embodiment of FIG. 2.

Referring now also to FIG. 3, rotor 20 includes one or more vanes 22 (also known as blades) which cause rotation when impinged by the flowing fluid. Similarly, rotor 21 includes one or more vanes 23. Vanes 22 and 23 are preferably spaced evenly around the periphery of the respective rotor hub. In addition, vanes 22 of rotor 20 are preferably canted oppositely from vanes 23 of rotor 21. This orientation of vanes 22 and 23 causes the two rotors to rotate in opposite directions at a rotational speed related to the fluid flow rate. For example, a controller can determine the frequency ratio of one turbine rotor to the other in order to determine the fluid flow rate.

As will be described, flow conditioner 24 is provided to enhance performance of meter 10 at low flow rates (such as less than two gallons per minute in some embodiments). Flow conditioner 24 includes one or more vanes 25 (also known as blades) or other material deflectors, which cause flow through the meter to have a greater angle of incidence upon vanes 22 of upstream rotor 20. As a result, rotor 20 will turn even under lower flow rate conditions. Thus, it is possible at very low flow rates to determine the frequency ratio.

In some embodiments, flow conditioner 24 may be stationary so that it does not rotate with respect to housing 12. For example, flow conditioner 24 may be affixed to shaft 18 or housing 12, or both. In other embodiments, flow conditioner 24 may be configured as a third rotor that rotates in a plane perpendicular to the axis of shaft 18. Vanes 25 of flow conditioner 24 are preferably canted in an opposite direction from those of rotor 20, as shown in FIG. 3.

In the illustrated embodiment, fluid entering housing 12 through inlet port 14 will encounter flow conditioner 24 generally in a direction parallel with axis A. (A flow straightener may be located upstream of flow conditioner 24 to further reduce turbulence in the entering fluid.) Because vanes 25 are canted, the straight fluid flow is converted into a generally swirling pattern with an angular trajectory based on angle 27 of vanes 25. This angular trajectory is generally oblique to axis A, as shown. The angle of the flow impacting on the blades of the first rotor should be as close to perpendicular as possible to maximize the force component in the direction perpendicular to the rotation axis. This would accelerate each blade amplifying the effect of the flow conditioner.

After passing through flow conditioner 24, the fluid impinges vanes 22 of rotor 20. The angular trajectory of the flow due to flow conditioner 24 increases the fluid's angle of incidence with vanes 22. As a result, the driving force used to impart rotational movement on turbine rotor 20 also increases. Accordingly, rotor 20 will rotate in direction 32 (in this case clockwise) as desired even during times of lower flow rates that are otherwise insufficient to turn rotor 20 if the flow is only axial.

In embodiments where flow conditioner 24 is rotatable, the flow may not be sufficient in some cases to turn flow conditioner 24. Nevertheless, once the fluid travels through flow conditioner 24, its angle of incidence will change. This facilitates rotation of rotor 20 in direction 32, as desired. Rotor 21 will also rotate (in opposite direction 36), thus permitting flow rate measurements to be taken. At higher flow rates, flow conditioner 24 will also begin to rotate as indicated at 34 (which is the same direction as 36).

As vanes 22 and 23 of rotors 20 and 21 pass by respective pickoff coils 29 and 30 (FIG. 2) mounted to housing 12, they create pulses at the respective coils. In particular, pickoff coils 29 and 30 are typically configured to generate a magnetic field that penetrates through housing 12 to reach the turbine rotors 20 and 21. As the rotors 20 and 21 rotate, vanes 22 and 23 superimpose a pulse signal on the carrier waveform of the magnetic field. These pulse signals can be later analyzed by a microprocessor, such as controller 60, or other suitable control system to determine fluid flow rate. For example, the frequency ratio of the signals at the two pickup coils can be determined as a basis for ascertaining the fluid flow rate. Instead of pickoff coils 29 and 30, any other suitable technique for detecting the rotation of the rotors 20 and 21 may be used.

Figure 4:
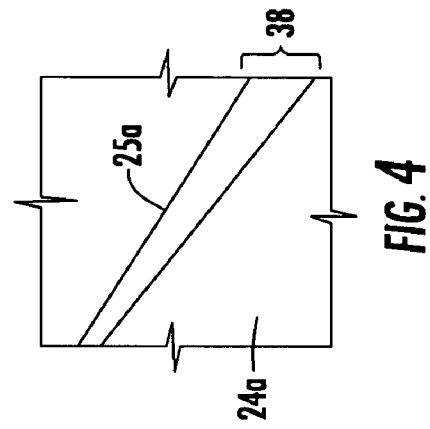
FIG. 4 is an enlarged fragmentary view of an alternative vane configuration for the flow conditioner.

Referring now to FIG. 4, it may be desirable in some embodiments to have vanes 25a of the flow conditioner (here designated 24a) which are thicker on the downstream side (designated at 38) in proximity to rotor 20. This would choke the fluid somewhat with a smaller section to add some flow acceleration due to venturi effect. This may further help rotor 20 to move. It should also add some difference in speed between the two rotors 20 and 21, but this could be compensated for in calibration.

While preferred embodiments of the invention have been shown and described, modifications and variations may be made thereto by those of ordinary skill in the art without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to be limitative of the invention as further described in the appended claims.

What is claimed is:

1. A turbine meter for measuring the flow of a fluid comprising:
    a housing defining a fluid flow path along a central axis thereof, said housing having an inlet port and an outlet port;
    a flow conditioner mounted in said flow path downstream of said inlet port, said flow conditioner having a plurality of flow deflectors canted in a first direction relative to said central axis;
    a first turbine rotor located downstream of said flow conditioner and mounted for rotation about said central axis;
    said first turbine rotor having a plurality of first rotor vanes canted in a second direction relative to said central axis, said second direction being opposite to said first direction;
    a second turbine rotor located downstream of said first turbine rotor and mounted for rotation about said central axis; and
    said second turbine rotor having a plurality of second rotor vanes canted in said first direction relative to said central axis such that said first and second turbine rotors to rotate in opposite rotational directions at rotational speeds indicative of fluid flow rate when fluid flows through said housing.

2. A meter in accordance with claim 1, wherein said flow deflectors of said flow conditioner are rotor vanes and said flow conditioner is rotational about said central axis.

3. A meter in accordance with claim 2, wherein said flow conditioner rotates in an opposite direction from said first turbine rotor when fluid flows through said housing.

4. A meter in accordance with claim 3, wherein said vanes of said flow conditioner are canted in an opposite direction but at substantially the same angle as said first rotor vanes.

5. A meter in accordance with claim 1, further comprising at least one detector affixed to said housing and operative to detect rotation of a corresponding one of said first and second turbine rotors.

6. A meter in accordance with claim 5, wherein said at least one detector comprises first and second detectors respectively associated with said first and second turbine rotors.

7. A meter in accordance with claim 6, wherein said first and second detectors are respective pickoff coils.

8. A meter in accordance with claim 1, wherein said flow conditioner is nonrotatable.

9. A fuel dispenser for dispensing fuel to a vehicle, comprising:
    a nozzle;
    a hose connected to said nozzle;
    a control system;
    a fuel delivery line in fluid communication with said hose;
    a valve located inline said fuel delivery line and under control of said control system, wherein said control system opens said valve to allow fuel to flow through said fuel delivery line to be delivered through said hose and said nozzle to the vehicle; and
    a turbine meter located inline said fuel delivery line, comprising:
        a housing defining a flow path between an inlet port and an outlet port;
        a flow conditioner mounted in said flow path, said flow conditioner having vanes canted in a first direction;
        a first turbine rotor mounted downstream of said flow conditioner and being rotational about an axis, said first turbine rotor having vanes canted in a second direction opposite said first direction;

a second turbine rotor mounted downstream of said first turbine rotor and being rotational about said axis;

said second turbine rotor having vanes canted in said first direction such that said first and second turbine rotors rotate in opposite directions when fuel flows through said housing; and first and second detectors operative to detect rotation of a respective one of said first and second turbine rotors.

10. The fuel dispenser of claim 7, wherein said flow conditioner is rotational about said axis.

11. The fuel dispenser of claim 8, wherein said flow conditioner rotates in an opposite direction from first turbine rotor when fuel flows through said housing.

12. The fuel dispenser of claim 9, wherein said vanes of said flow conditioner are canted at substantially the same angle as said vanes on said second turbine rotor.

13. A turbine meter for measuring the flow of a fluid comprising:

a housing defining a fluid flow path;

a flow conditioner mounted in said flow path, said flow conditioner having a plurality of flow deflectors canted in a first direction;

a first turbine rotor located downstream of said flow conditioner and having a plurality of first rotor vanes canted in a second direction opposite to said first direction;

a second turbine rotor located downstream of said first turbine rotor and having a plurality of second rotor vanes canted in said first direction such that said first and second turbine rotors to rotate in opposite rotational directions when fluid flows through said housing; and first and second detectors respectively associated with said first and second turbine rotors to detect rotation thereof.

14. A meter in accordance with claim 13, wherein said flow deflectors of said flow conditioner are rotor vanes and said flow conditioner is rotational.

15. A meter in accordance with claim 14, wherein said flow conditioner rotates in an opposite direction from said first turbine rotor when fluid flows through said housing.

16. A meter in accordance with claim 15, wherein said vanes of said flow conditioner are canted in an opposite direction but at substantially the same angle as said first rotor vanes.

17. A meter in accordance with claim 13, wherein said first and second detectors are respective pickoff coils.

18. A meter in accordance with claim 13, wherein said flow conditioner is nonrotatable.

* * * * *